United States Patent Office 3,127,560
Patented Mar. 31, 1964

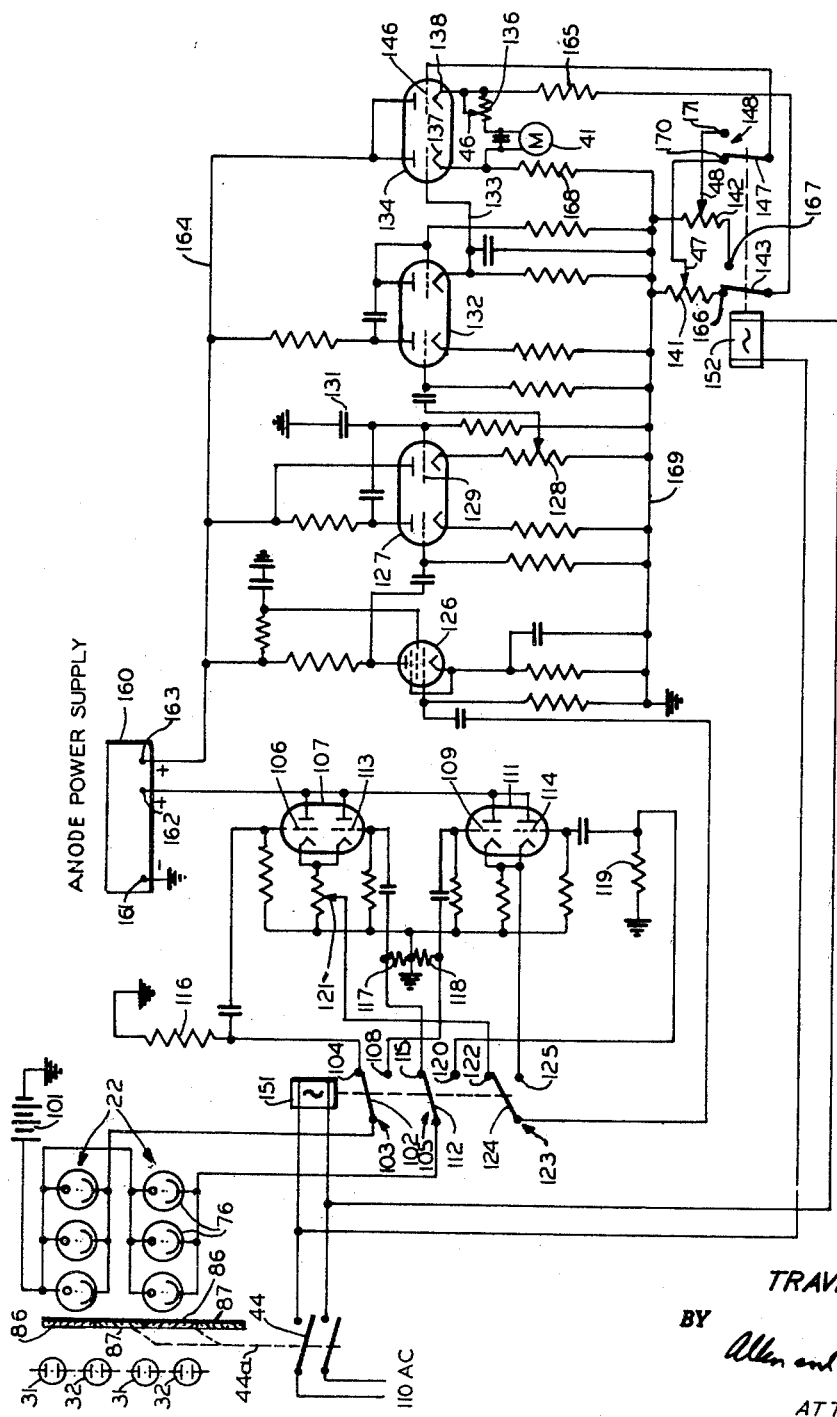

3,127,560
AMPLIFIER FOR PHOTOELECTRIC BRIDGE
SPECTROPHOTOMETER
Traver J. Smith, San Jose, Calif., assignor, by mesne assignments, of one-half to Genevieve I. Magnuson and one-half to Genevieve I. Magnuson, Robert Magnuson, and Lois J. Fox, as trustees
Original application May 24, 1952, Ser. No. 289,717, now Patent No. 3,016,788, dated Jan. 16, 1962. Divided and this application Apr. 18, 1961, Ser. No. 103,858
6 Claims. (Cl. 324—123)

This invention relates to an amplifying apparatus in general. More particularly, this invention relates to an amplifying apparatus adapted for use in a ratio indicating or meter circuit.

This application is a division of application Serial No. 289,717, filed May 24, 1952, now U.S. Patent No. 3,016,788, for Method and Apparatus for Color Grading of Fruits and Vegetables.

An object of this invention is to provide an improved amplifier that is adapted to respond selectively to separate electrical signals.

Another object of this invention is to provide an improved amplifier and meter circuit which is provided with an adjustment so that the ratio of response of the amplifier and meter to separate signals may be controlled.

Another object of this invention is to provide an improved amplifier having a plurality of input channels adapted to be connected to light sensitive cells for receiving luminous energies in different parts of the spectrum, said amplifier also having indicating means adapted to be calibrated for indicating the relative intensities of the luminous energies.

Still another object of this invention is to provide an amplifier having a pair of input circuits which may be adjusted to have relatively different signal response so that initially the amplifier may be adjusted to a predetermined response ratio.

A further object of this invention is to provide an amplifier circuit having a meter bridge circuit connected to the output thereof, which bridge circuit is provided with a plurality of calibrating potentiometers, selected ones of which are adapted to be connected to the meter circuit depending upon which amplifier input channel is employed.

Other and further objects of this invention will be apparent to those skilled in the art to which it relates from the following specification, claims and drawings.

In accordance with this invention, there is provided an amplifying circuit with a plurality of input channels which may be connected selectively to two sets of light sensitive cells. Associated with these cells are two light filters for selectively passing light from different parts of the spectrum to the cells to provide signals which are supplied to selected inputs of the amplifier. At the same time calibration potentiometers connected to the meter bridge circuit at the output of the amplifier are also selected so that the relative strengths of the signals may be indicated on the meter scale.

Further details of this invention are set forth in the following specification, claims and drawing in which the sole figure is a schematic diagram of connections of this apparatus.

Referring to the drawing in detail, there is illustrated an amplifier and indicating circuit connected to be supplied with signals by two groups 22 of light sensitive cells 76 which are adapted to be energized by light produced by light sources 31 and 32 and reflected by a product to be graded to the cells 76 through selected filters 86 and 87 as described in detail in the parent application. Light sources 31 and 32 are adapted for example to produce light having strong lines in the red and blue portions of the spectrum, respectively, such as the 632, 640 and 651 millimicron red lines produced by an electric discharge lamp having neon gas, and the 436 millimicron blue line produced by an electric discharge lamp having mercury vapor. Filters 86 and 87 are red and blue filters, respectively. Filter 86 passes the 632, 640 and 651 millimicron red lines and filters out most of the other light, while filter 87 passes the 436 millimicron blue line and filters out most of the other light. These filters are adapted to be shifted in and out of the path of the light rays reflected to the cells 76 from the product being illuminated by the light sources 31 and 32. Either filters 86 are both simultaneously interposed in the paths of light rays to cells 22 or filters 87 are both simultaneously so disposed. Thus both groups of cells 22 are simultaneously illuminated by light reflected thereto either through filters 86 or through filters 87.

The anodes of the two groups 22 of phototubes 76 are connected to the positive terminal of the current supply source 101 having a suitable voltage, and this source may comprise suitable battery or a rectified A.C. source. Phototubes of type 926 with S-3 spectral response may be used. The cathodes of the tubes in one of these two groups 22 are connected to the movable contact arm 102 of a single-pole double-throw switch 103, one stationary terminal or contact 104 of which is connected to the grid 106 of a thermionic mixing tube 107. The other stationary terminal 108 of the switch 103 is connected to the grid 109 of a similar tube 111. Similarly the cathodes of the other group of phototubes are connected to the movable arm 112 of a single-pole double-throw switch 105, one terminal 115 of this switch being connected to the grid 113 of the tube 107. The other terminal 120 of this switch is connected to the grid 114 of the tube 111.

Switches 103, 105 and 123 are mechanically connected to relay 151. When the winding of this relay is energized by closing switch 44, switch arms 103, 112 and 124 engage contacts 108, 120 and 125, respectively, and when this winding is de-energized these switch arms engage contacts 104, 115 and 122 respectively. Switch 44 is also mechanically connected to filters 86 and 87 as indicated by the linkage 44a shown in broken lines, so that when this switch is closed, blue filter 87 is in its operating position.

As shown, the circuit is in its red position, that is, both groups of phototubes 22 are connected to the two grids 106 and 113 of a mixing tube 107 which is connected as a cathode follower type amplifier and this tube is of the type known commercially as a 6SC7. If the two movable arms 102 and 112 of the double-throw switches 103 and 105 respectively engage contacts 108 and 120 respectively, that is, the blue position, the cathodes of the two groups of phototubes are connected to feed their signals to the grids of the blue mixing tube 111 which is of the same type as the tube 107. Grid resistors 116, 117, 118 and 119, connected between ground and the respective leads to the grids 106, 113, 109 and 114, are selected in value to spectrally balance the dual input to the mixing tubes. Also, a potentiometer 121 is placed in the cathode circuit of tube 107, this tube being of the cathode follower type, to provide an adjustment of ratio of output signals between the red and the blue tubes to compensate for a lower blue response and to provide a higher meter reading of the blue values. While this may be adjusted to a desired value for any particular product being color graded, in color grading tomatoes for ripeness, it has been found that a ratio of 1–5 in the output of these tubes is a satisfactory value.

The leads from the respective cathodes of tubes 107 and 111 are connected to the respective terminals 122 and 125 of a single-pole double-throw switch 123, the movable arm 124 of which is coupled through a capacitor to the control grid of a conventional-type amplifier tube 126 of the 6SJ7 type which is provided with a conventional circuit arrangement of resistors and condensers for an A.C. amplifier. The output of the amplifier tube 126 is coupled to the control grid of the first half of tube 127 of the 6SN7 type, the first stage being connected as a voltage amplifier stage, and the second stage being connected as a cathode follower type current amplifier. Associated with the cathode output of the tube 127 is a potentiometer 128 which serves as the gain control of the amplifier circuit.

To limit possible interference from outside sources of A.C. voltage, the second stage grid 129 of the tube 127 is connected to a capacitor 131 of a suitable value which acts as a low-pass filter to ground for frequencies above about 200 c.p.s., so that such interfering frequencies are eliminated. The adjustable contact of the potentiometer 128 is coupled to the grid of the first-stage amplifier of the dual triode tube 132 of the 6SN7 type. The second stage of the tube 132 is connected as a diode with the plate and grid connected together and functions as a detector. The cathode output therefrom is connected by a lead 133 to the grid of the first stage of the dual triode tube 134, which is also of the 6SN7 type. The tube 134 is connected into the meter bridge and the anodes thereof are connected together to line 164 which is connected to the terminal 163 of the anode current supply 160 of this apparatus. A "standardize" potentiometer 136 is connected in series with the meter 41 of the D'Arsonval type, between the two cathodes 137 and 138. The cathode circuit of the cathode 138 may be made to include selectively either a red potentiometer 141 or a blue potentiometer 142. This selective connection of the potentiometers is provided by a single-pole double-throw switch 143 having its movable contact arm connected to the cathode 138 through resistor 165 and having its stationary contacts 166 and 167 connected respectively to the potentiometers 141 and 142. The resistor 168 is connected between cathode 137 and ground line 169 which may be the metal chassis of the amplifier. The grid 146 of the second half of tube 134 is connected to the movable center arm 147 of a single-pole double-throw switch 148 whose stationary contacts 170 and 171 are connected respectively to the adjustable contacts 47 and 48 of the potentiometers 141 and 142. Movable arms 143 and 147 are mechanically coupled to the relay 152 so that when the winding of this relay is energized by closing switch 44, these switches are controlled.

This circuit is useful in the color grading of fruits and vegetables and in grading tomatoes, for example, the circuit is first calibrated as to ratio of response, using suitable standards such as red or other colored discs of suitable plastic which are supported so as to reflect diffused light to the photoelectric cells 22, first through one set of filters, for example filters 86, and then through the other set. With these discs in viewing position, and using the ratio control potentiometer 121, the circuit is adjusted until the sensitivity of the blue reflectance reading on meter 41 is five times that of the sensitivity of the red reflectance reading. This establishes a suitable on-scale reading on meter 41 for the blue response of the amplifier.

After adjusting the circuit as above described, it is next adjusted for the red and blue "zeros." By using black plastic discs to reflect diffused light to the photo-electric cells 22 and with the circuit set for blue response, i.e., with the blue filters in position and the blue circuit components active, the "blue zeroize" control 48 is adjusted so that the potentiometer 142 produces a zero reading of the meter 41. Then switching by means of the switching arm 44 to the red response, the "red zeroize" control 47 is operated to change the potentiometer 141 until the meter 41 again reads zero. Since the zero adjusting potentiometers 141 and 142 and the ratio adjusting potentiometer 121 are interdependent and adjustment of one will affect the other, then it is necessary to repeat the above adjustment procedures until a zero reading is obtained on the meter 41 with the black plastic discs in place and also have a sensitivity ratio of 5 to 1. The circuit is then calibrated ready for use to grade tomatoes, for example.

Two halves of the same tomato are then placed so that their cut surfaces are subjected to a grazing incidence of uniformly mixed, distributed and diffused light of 120 c.p.s. from the red light sources 31. The red filters 86 are in position so that substantially only the 640 millimicron red line is transmitted to the phototubes 22 from the light reflected from the cut tomato surfaces. Utilizing the "standardize" control 46 the meter 41 reading is set to 100, a selected arbitrary value which may be near the maximum reading of the meter scale. Thereafter, the switch arm 44 is adjusted to place the instrument in its blue response and the meter 41 is again read. This reading then provides an indication of the color of the tomato. Similar procedure may be followed for color grading other products.

In the use of this apparatus for color grading tomatoes, for example, the green 546 millimicron wavelength line may be selected instead of the blue 436 millimicron line. Both of these lines are present in the spectrum of the mercury vapor lamp. Also it may be desirable to provide switching in the output circuits of tubes 107 and 111 instead of the grid circuits thereof so that the photoelectric cells 22 may be permanently connected to these grid circuits.

While I have shown a preferred embodiment of the invention, it will be understood that the invention is capable of variation and modification from the form shown so that its scope should be limited only by the scope of the claims appended hereto.

What I claim is:

1. An amplifier adapted for use in color grading of products comprising means responsive selectively to separate electrical signals, said means including at least two amplifying tubes, said tubes having separate input circuits and output circuits, an indicating device, switch means for selectively connecting either of said tube output circuits to said indicating device, and a variable resistor connected to the output circuit of one of said tubes for controlling the ratio of response of said indicating device to said separate electrical signals.

2. An amplifier adapted for use in color grading of products comprising means responsive selectively to separate electrical signals, said means including at least two amplifying tubes, said tubes having separate input circuits and output circuits, an indicating device, switch means for selectively connecting either of said tube output circuits to said indicating device, and a variable resistor connected to the output circuit of one of said tubes for controlling the ratio of response of said indicating device to said separate electrical signals corresponding to different colors.

3. An amplifier adapted for use in color grading of products comprising means responsive selectively to separate electrical signals, said means including at least two amplifying tubes, said tubes having separate input circuits and output circuits, an indicating device, switch means for selectively connecting either of said tube output circuits to said indicating device so that different ones of said electrical signals corresponding to different colors are supplied to said indicating device, and a variable resistor connected to the output circuit of one of said tubes for controlling the ratio of response of said indicating device to said separate electrical signals corresponding to different colors.

4. An amplifier adapted for use in color grading of products comprising means responsive selectively to separate electrical signals, said means including at least two amplifying tubes, said tubes having separate input circuits and output circuits, an indicating device, switch means for selectively connecting either of said tube output circuits to said indicating device so that different ones of said electrical signals corresponding to different colors are supplied to said indicating device, a variable resistor connected to the output circuit of one of said tubes for controlling the ratio of response of said device to said separate electrical signals and an electrical bridge circuit connected to said indicating device, and variable impedance devices for adjusting the zero response of said indicating device for signals corresponding to different colors independently.

5. An amplifier adapted for use in color grading of products comprising means responsive selectively to separate electrical signals, said means including at least two amplifying tubes, said tubes having separate input circuits and output circuits, an indicating device, switch means for selectively connecting either of said tube output circuits to said indicating device so that different ones of electrical signals corresponding to different colors are supplied to said indicating device, a variable resistor connected to the output circuit of one of said tubes for controlling the ratio of response of said device to said separate electrical signals and an electrical bridge circuit connected to said indicating device, and variable impedance devices for adjusting the zero response of said indicating device for signals corresponding to different colors independently, said bridge circuit including an electric discharge device in each of two legs thereof and means for connecting said variable impedance devices to one of said electric discharge devices selectively.

6. An amplifier adapted for use in color grading of products comprising means responsive selectively to separate electrical signals, said means including respectively at least two amplifying tubes, said tubes having separate input circuits and output circuits, an indicating device, switch means for selectively connecting either of said tube output circuits to said indicating device so that different ones of said electrical signals corresponding to different colors are supplied to said indicating device, a variable resistor connected to the output circuit of one of said tubes for controlling the ratio of response of said device to said separate electrical signals, and an electrical bridge circuit connected to said indicating device, and variable impedance devices for adjusting the zero response of said indicating device for signals corresponding to different colors independently, said bridge circuit including an electric discharge device in each of two legs thereof, each of said electric discharge devices having a grid, a cathode and an anode, means for connecting said anodes together, means for supplying the electric signals to the grid of one of said devices, means for connecting said indicating device between the cathodes of said devices, and means for selectively connecting said variable impedance devices to the grid of the other of said electric discharge devices.

References Cited in the file of this patent

UNITED STATES PATENTS

| | | |
|---|---|---|
| 2,244,826 | Cox | June 10, 1941 |
| 2,571,650 | Atwood | Oct. 16, 1951 |
| 2,802,181 | Gorski | Aug. 6, 1957 |
| 2,989,701 | Gill | June 20, 1961 |

FOREIGN PATENTS

| | | |
|---|---|---|
| 406,890 | Great Britain | Mar. 8, 1934 |

OTHER REFERENCES

Smith, T. J., and Huggins, R. A.: Tomato Classification by Spectrophotometry, Electronics, January 1952, pp. 92–94.